United States Patent Office 3,008,545
Patented Nov. 14, 1961

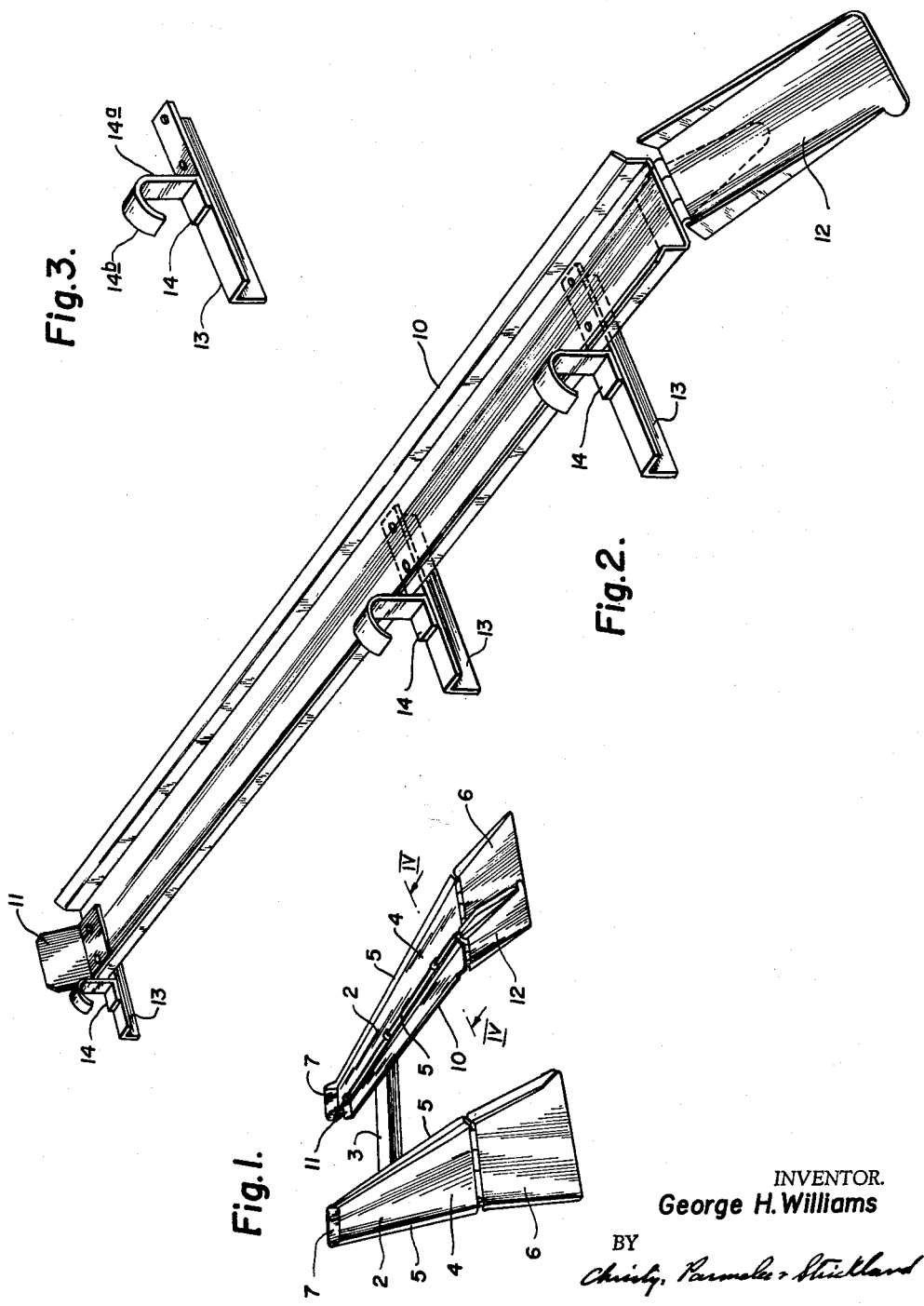

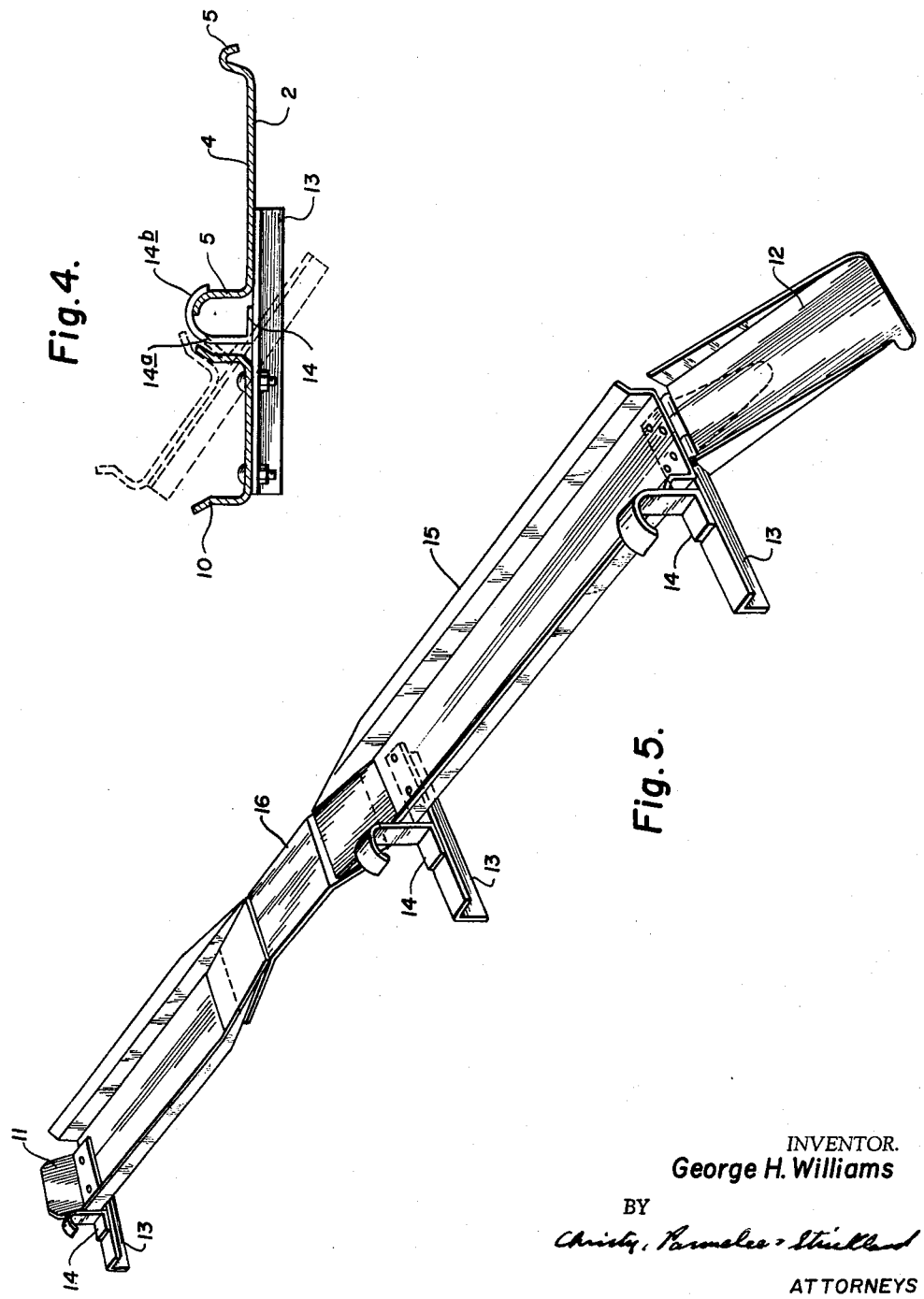

3,008,545
AUTOMOBILE LIFTS AND AUXILIARY RAIL THEREFOR
George H. Williams, 940 Hazen Road, Sharpsville, Pa.
Filed Feb. 11, 1959, Ser. No. 792,528
1 Claim. (Cl. 187—8.67)

This invention relates to automobile lifts such as are commonly provided in automobile service stations and garages for elevating a vehicle above the floor for access to the under side thereof for purpose of repair, lubrication, or other required service.

Lifts of this nature have been extensively used throughout this country and have been designed for standard width American-built automobiles. They are too wide to receive the various foreign cars and sub-standard width cars which have in recent times come into extensive use, with the result that service stations must either reject servicing such cars, or resort to less convenient and less accessible procedures.

The present invention has for its principal object to provide an auxiliary rail which may be quickly applied to and removed from the lifts now in use, and which is parallel to one of the two conventional rails provided for the wheel track on the lift so that a vehicle of sub-standard width can have the wheels on one side thereof use one of the regular rails of the lift, while the wheels on the other side of the vehicle are received on the auxiliary rail. Being readily detachable, it does not interfere with the use of the lift or the space between the main rails of the lift in servicing standard width cars.

A further object of my invention is to provide a simple, safe auxiliary rail for this purpose with unique means for securing it quickly in place for quick removal without tools or wrenches.

My invention may be more fully understood by reference to the accompanying drawings, in which:

FIG. 1 is a perspective view of a typical lift with the auxiliary rail in place;

FIG. 2 is a perspective view on a larger scale of the auxiliary rail removed, the rail here shown being for attachment to the left main rail of the lift;

FIG. 3 is a perspective view of one of the attaching hooks and cross member assemblies removed from the auxiliary rail to which it is normally attached;

FIG. 4 is a transverse section in the plane of line IV—IV of FIG. 1, but on a larger scale, showing the manner of attaching the auxiliary rail to the main rail on which it is carried; and FIG. 5 is a view similar to FIG. 2 for an auxiliary rail for use on lifts having a high cross member at the center between the main rails.

The usual lift has two main rails 2 which are rigidly carried at the opposite ends of a central cross member 3. A fluid pressure ram (not shown) is located under the central cross member at the middle thereof and is countersunk into the floor so that the rails are normally close to floor level, but upon operation of the ram, the lift can be raised well above the floor level to the height required. The main rails are generally roll-formed sections of metal plate with a web 4 and a flange 5 at each side to form a channel section. Generally the top edge of the flange is flared outwardly, sometimes being angled, and at other times being curved, so that the projected or over-all transverse section of the flange is greater than the actual thickness of the metal of which it is formed. Generally each main rail has a short hinged ramp 6 at the entering end and an abutment 7 at the opposite end. Different makers of this equipment have different specific shapes, but they practically all have this general construction.

According to the present invention there is an auxiliary rail member 10 also of channel section, and which is preferably shorter than the main rail, since the smaller cars have a shorter wheel base. There is a fixed abutment 11 at one end of the auxiliary track and a ramp section 12 is hinged to the forward end and is preferably of approximately the same length as the ramp on the main track.

Bolted to, or otherwise fixed to the under side of the auxiliary rail near each end thereof are transverse rigid metal sections or members 13 which project beyond one side of the auxiliary rail, and one or more similar sections may be provided intermediate the two end ones. I prefer that there be three such members. On top of the projecting end of each member 13 and inwardly toward the auxiliary rail from the protruding end thereof is welded or otherwise secured a hook 14 having a vertical shank 14a and an inverted open U shaped end 14b which is turned away from the auxiliary rail.

The hooks 14 are designed to fit over the inner flange 5 of one of the main rails, while the projecting end of the rigid members 13 extend under the flat web 4 of the main rail. The attachment is put in place by tilting the auxiliary track crosswise toward the main rail onto which it is to be hung, as indicated in dotted lines in FIG. 4, to engage the hooks over the inner flange of the main rail, and then the auxiliary rail is leveled to project the extensions 13 under the bottom of the main rail. The hooks take the vertical load of the vehicle resting on the auxiliary rail and transmit it to the main rail and hold the auxiliary rail parallel with the main rail, while the members 13 engaging under the main rail are cantilevered against the bottom of the main rail to prevent the auxiliary rail from swinging down past a horizontal plane, or from "see-sawing" when there is more weight at one end of the auxiliary rail than the other.

The auxiliary rail may be of lighter gauge metal than the main rail, and as above pointed out, it is shorter, so that it can be applied to or detached from the lift by one man. Hence, when a standard car has to be placed on the lift for work which may require access to the under side thereof, the auxiliary rail, which might otherwise restrict access to the part of the standard car needing attention, can be quickly removed. At the same time the hooks 14b are of flattened section so that if a standard car rolls onto the main rails while the auxiliary rail is in place, the hooks will not damage the tires or be damaged by them.

I prefer to bolt the members 13 to the auxiliary rail, as by so doing I can reverse the members 13 with their hooks to project from either side of the auxiliary rail, adapting it for application to either the right or left main rail of the lift.

In many cases the cross piece 3 of the lift rises to the height of the top of the flanges of the main rail, or perhaps slightly higher. Where this is the case, the auxiliary rail, designated 15 in FIG. 5, is made with an arch or saddle portion 16 where it passes over the cross frame member of the lift. This provides vertical clearance for the auxiliary rail over the cross structure, but permits the hooks and member 13 to be properly engaged with the main rail.

While I have shown and described certain preferred forms of my invention, it will be understood that the device may be variously modified to meet requirements of particular lifts or otherwise within the scope of my invention.

I claim:

An auxiliary rail for attachment to a main rail of an automobile lift comprising a rail member of channel section, spaced rigid cross members secured to the under side of the bottom of the auxiliary rail and projecting laterally to one side only beyond the auxiliary rail, a hook member on each cross member located between the projecting end of the cross member and the auxiliary rail, each hook having a vertical shank portion bent over at its top away from the auxiliary rail to form a downwardly-opening hook portion, the rigid cross member being of a length to extend under and bear against the main rail of the lift when the hooks are engaged over the side flange of the main rail, the hooks being of such length that the auxiliary rail will be in the plane of the main rail when the attachment is hung on the main rail, the auxiliary rail being upwardly arched intermediate its ends to clear the cross frame of an automobile lift to which the auxiliary rail is applied.

References Cited in the file of this patent

UNITED STATES PATENTS

| | | |
|---|---|---|
| 704,957 | Croom | July 15, 1902 |
| 1,620,407 | Streif | Mar. 8, 1927 |
| 1,926,368 | Bristol | Sept. 12, 1933 |
| 2,602,633 | Reedy | July 8, 1952 |